Figure 1:
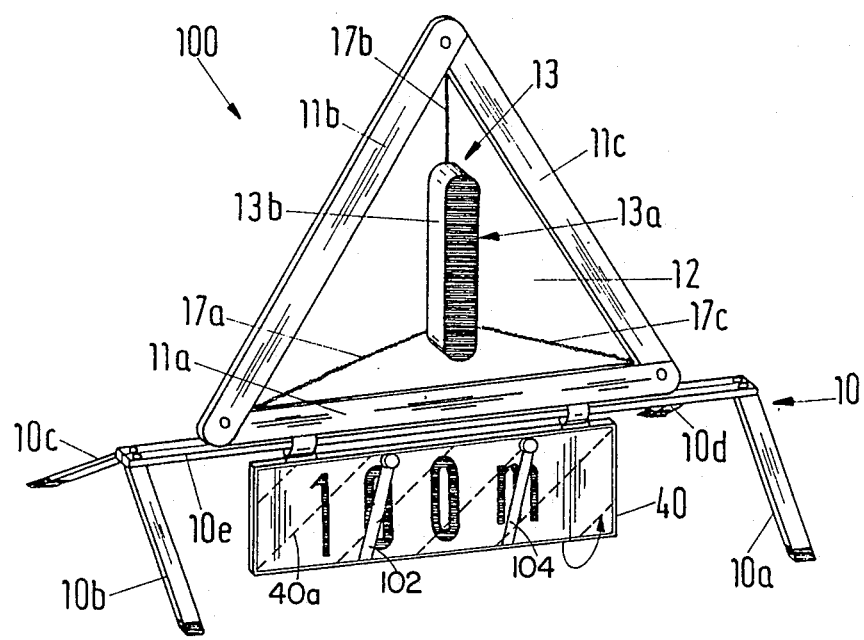

United States Patent [19]

Straten et al.

[11] Patent Number: 4,952,910

[45] Date of Patent: Aug. 28, 1990

[54] WARNING TRIANGLE FOR MOTOR VEHICLES

[76] Inventors: Günter Straten, Meilsdorfer Damm 12, D-2071 Siek-Meilsdorf; Klaus-Jürgen Kiefer, Jungfernstieg 34, D-2000 Hamburg 36, both of Fed. Rep. of Germany

[21] Appl. No.: 317,936

[22] Filed: Mar. 2, 1989

[30] Foreign Application Priority Data

Mar. 5, 1988 [DE] Fed. Rep. of Germany ....... 3807300

[51] Int. Cl.$^5$ ............................................. B60Q 7/00
[52] U.S. Cl. .................................. 340/473; 340/474; 340/908; 40/612; 116/63 T
[58] Field of Search ............... 340/473, 471, 472, 474, 340/908.1, 908, 907; 116/63 T, 63 P; 40/612; 15/250 A, 250 B, 250 R, 280.05

[56] References Cited

U.S. PATENT DOCUMENTS

| | | | |
|---|---|---|---|
| 2,674,726 | 4/1954 | Williams | 340/474 |
| 2,997,573 | 8/1961 | Nyborg | 340/473 |
| 3,240,455 | 5/1962 | Swezy et al. | 340/473 |
| 3,823,384 | 7/1974 | Messmer et al. | 340/473 |
| 3,947,815 | 3/1976 | Muncheryan | 340/472 |
| 3,975,849 | 8/1976 | Tuleja | 116/63 T |
| 4,108,311 | 8/1978 | Mc Clendon | 206/803 |
| 4,403,565 | 9/1983 | Bleiweiss et al. | 116/63 P |
| 4,505,001 | 3/1985 | Fasolind | 15/250 A |
| 4,613,847 | 9/1986 | Scolari et al. | 340/473 |
| 4,728,775 | 3/1988 | Van Straten | 219/202 |

FOREIGN PATENT DOCUMENTS

| | | | |
|---|---|---|---|
| 2236793 | 2/1974 | Fed. Rep. of Germany | 116/63 T |
| 2316510 | 10/1974 | Fed. Rep. of Germany | 116/63 T |
| 3434091 | 7/1985 | Fed. Rep. of Germany | 116/63 T |
| 2192017 | 6/1986 | United Kingdom | 340/473 |
| 2188355 | 9/1987 | United Kingdom | 116/63 T |

*Primary Examiner*—Joseph A. Orsino
*Assistant Examiner*—Geoff Sutcliffe

[57] ABSTRACT

A foldable, warning triangle includes illuminating and audible alerting indicators to warn oncomers of vehicular accidents and other danger conditions. Flashing lights may be powered from self-contained batteries or from an external source such as an automobile battery and the flashing rate may be set by an internal timing circuit or may be derived from the collision-avoidance lamp of an automobile.

29 Claims, 2 Drawing Sheets

WARNING TRIANGLE FOR MOTOR VEHICLES

The present invention relates to a warning triangle for motor vehicles which, in shape and color, corresponds to the "Danger Spot" danger sign, consisting of a stand which is preferably inwardly and outwardly foldable, three reflector legs arranged in the form of a triangle and an interjacent white (background) surface with a vertical black bar, wherein the warning triangle is luminous and the lighting is supplied with power by means of a cable that is directly or indirectly connectable with the vehicle battery or by means of a power source incorporated into the warning triangle.

According to traffic regulations, above-mentioned warning triangles must be portable, stable against toppling over and constituted so that, when in use, they can be perceived from an adequate distance. Warning triangles must be retroreflective.

As a general rule, foldable or collapsible warning triangles of the aforementioned type are used which are accommodated in a tubular case. After removal from said case, the stand component parts are appropriately folded out, the reflector legs are set up and secured by means of a patent button closure means just like the inner portion having a white background surface mostly constructed in the form of a plastic fabric and a vertical black bar. However, this warning triangle is subject to the disadvantage that when visibility is poor, especially in rain, at dawn or at dusk, in darkness or when it is snowing or in fog, it can be perceived only with great difficulty and, in many cases, be overlooked altogether with the consequence of a serious danger to traffic.

The circumstance that in many cases the estimation of distances being effected incorrectly has also proved to be disadvantageous. Thus, by way of example, on superhighways on which the warning triangle is supposed to be put up at a distance of at least 150 m from the broken-down vehicle, the following traffic may take notice of the "Danger Spot" danger sign much too late.

Moreover, a foldable or collapsible warning triangle for motor vehicles is already known which, in shape and color, corresponds to the "Danger Spot" danger sign and consists of a stand which can be inwardly and outwardly folded, of three reflector legs arranged in the form of a triangle and and interjacent background surface with a black bar. In this warning triangle, provision is made for a warning light to be fitted to one of the reflector legs (DE-GM 81 21 669.6).

Furthermore, a breakdown warning unit for motor vehicles is known which consists of a warning triangle mounted on the wall of a suitcase which can be closed by means of a lid and which is maintained in the displayed condition by the suitcase, in which the wall of the suitcase which supports the warning triangle and the warning triangle proper consist of translucent material and, in the suitcase, a light source is disposed, the warning triangle being illuminable from within by this light source (DE-GM 85 10 200).

In another proposed warning triangle for motor vehicles which is portable, provision is made for the warning triangle to be fitted with a lighting means, in which the lighting means is disposed in the legs of the warning triangle and the reflector strips are covered, the lighting means being supplied with power by means of a cable which can be connected directly or indirectly to the vehicle battery (DE-GM 85 23 829).

All these three warning triangles are subject to the disadvantage that they are constructed in a manner which involves an expensive construction and takes up much space and that a reliable illumination of the white surface and of the reflector legs is not always provided. Serious dangers to traffic ensue herefrom.

That is why it is the object of the present invention to improve the warning triangle mentioned in the beginning while avoiding the disadvantages pointed out, it is intended in particular for it to be clearly visible already from a great distance even when it is snowing, in fog and in heavy rain.

The technical problem is solved in the warning triangle in question in that, in principle, it is foldable in a known manner according to the state of the art and in that the bar fitted with the lighting means is constructed in the form of a cuboid.

Preferably, two alternatives are proposed to this end: On the one hand, according to a further development of the invention, the lighting means is disposed inside a cuboid which, at the same time, is intended to serve as a vertical black bar, in such a way that the longitudinally located opposite surfaces are blackened so as to be opaque and the translucent narrower lateral surfaces emit light in the direction of the reflector legs. By this means, both the white background as well as the reflector legs are lighted up. The special advantage resides in that this embodiment, can, in principle, also be foldably returned again into a small tubular case. On the other hand, in another embodiment, the entire warning triangle can, as a complete solid body, be equipped with an integrated lighting system, be mounted on a cuboid which is intended to serve simultaneously as a vertical black bar, and in such a way that the longitudinally located opposite surfaces are blackened so as to be opaque and the narrower lateral surfaces reflect light in the direction of the reflector legs and thus the still movable parts of the latter are the feet of the foldable stand. The solid body does require more space, it is true, but it possesses the advantage of being able to be set up so as to be immediately operable.

The lighting system of the warning triangle can be supplied with power either by one or by several battery (batteries) which are disposed either inside the cuboid or inside the warning triangle. As an alternative to this, the power supply of the lighting system may also be ensured by means of a cable that can be connected directly or indirectly to the vehicle battery, especially by means of a suitable plug located in the cigarette lighter or in the lugagge compartment.

If the cable or the distance-indicating cord is provided with appropriate markings and/or knot-like thickened portions and/or lighting elements such as incadescent lamps, lamps flashing at predetermined intervals, e.g. at a run-out cable length of 50 m, 100 m or 200 m, then the driver of the broken-down vehicle to be rendered safe will be able to see at once at which distance from the vehicle he happens to be at the moment with the portable warning triangle carried along and to be set up, and this even in the dark. The cable or distance-indicating cord may in this case preferably be luminous or provided with a warning color. It is also possible to provide the cable or the distance-indicating cord with reflecting fittings. For preference, the cable is wound onto a drum attached on or in the warning triangle, e.g. the drum may possibly be detachably secured on the stand on the rear of the warning triangle so as not to restrict the visibility of the warning triangle.

According to a further embodiment of the invention, the lighting system of the warning triangle operates in the form of an automatic flashing circuit, preferably in rhythm with the vehicle anti-collision warning system. The operation may also be effected independently of the vehicle with the aid of batteries, which is of advantage in the case of traffic accidents.

It has been proved that continuously lighted objects receive less attention than those which are only intermittently lighted.

The appropriate light timing signal of the warning triangle consequently is noticed already when the warning triangle is e.g. located behind a bend and thus not yet visible. Preferably, a free swinging multivibrator is employed as timing generator which can be obtained commercially and at little expense.

According to a further embodiment of the invention, the timing of the intermittently lit warning triangle is set so as to be synchronous with the rhythm of the vehicle anti-collision warning system. This can be effected in a simple manner in that the lighting for the warning triangle is connected to the timing generator of the anti-collision warning system.

In order to be able to continue to construct the warning triangle in a manner permitting it to be folded, the flat lighting cuboid is suspended by means of flexible cords via eyelet connections on the corner points of the reflector legs. For this purpose, the plastic sheet fabric surface can preferably continue to be constructed with or without a cutout.

Advantageous further developments of the invention are characterized in the subclaims.

Embodiments of the invention are depicted in the drawings and will be explained in the following.

Figure 2:
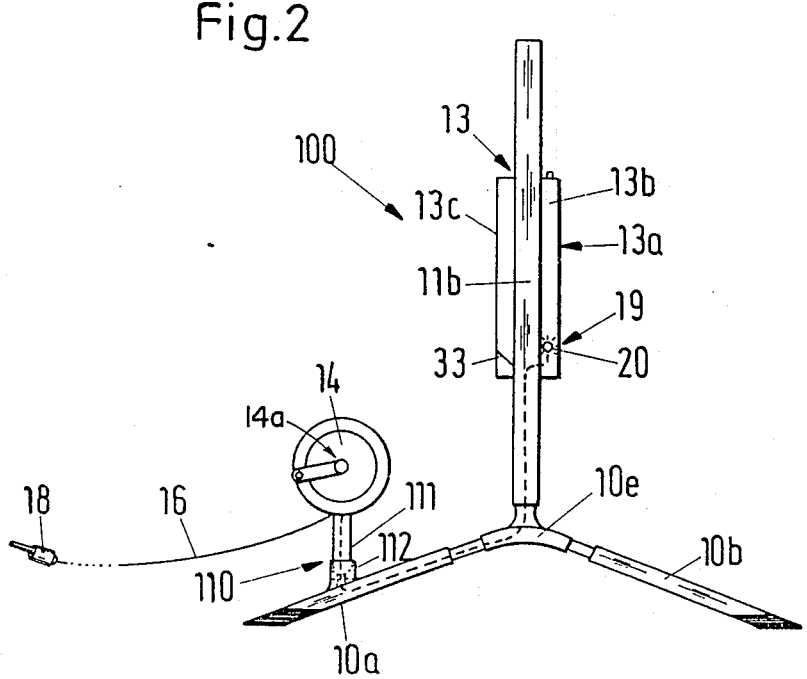
Figure 3:
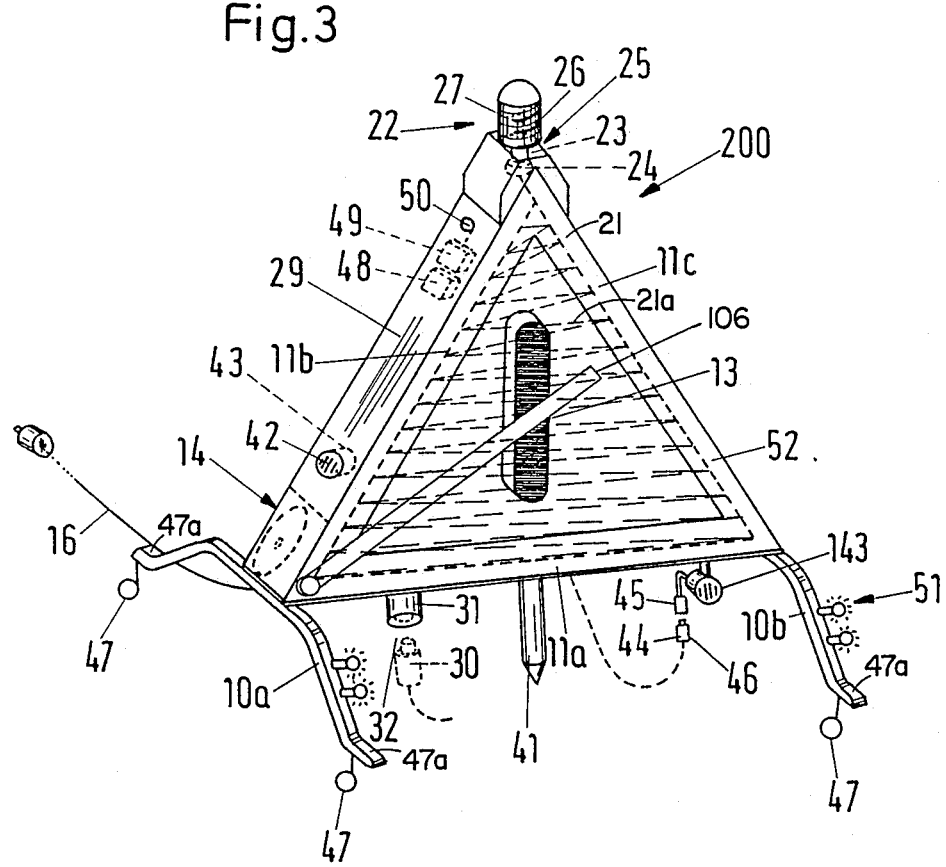
Figure 4:
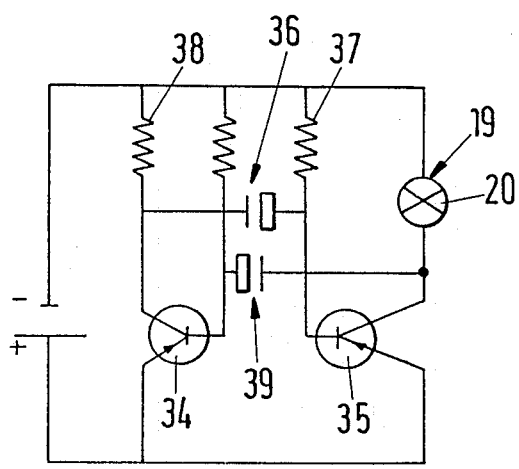

FIG. 1 shows a front view of a foldable warning triangle according to the present invention, FIG. 2 shows a side elevation of the warning triangle according to the FIG. 1, FIG. 3 shows a further embodiment of the warning triangle according to the invention in a solid body construction, and FIG. 4 shows a free swinging multivibrator flashing circuit.

The warning triangle 100 depicted in the FIGS. 1 and 2 consists of a stand 10, the center bar 10e of which is provided on both sides with the outwardly folding flat iron struts 10a to 10d each. The actual warning triangle is rigidly connected to the center bar 10e and stands upright, which possesses three reflector legs 11a, 11b, 11c as external edging of a triangle and a white plastic sheet 2 fitted therein. Instead of the embodiment known hitherto according to the prior art, for preference a luminous cuboid is suspended in the form of a black bar 13 into an appropriate cutout in said plastic sheet 12, the front and the rear surfaces 13a, 13c of which are blackened so as to be opaque. On the other hand, the respective abutting lateral surfaces 13b are translucent so that both the plastic sheet 12 as well as the reflector legs 11a, 11b, 11c can be lit, i.e. are illuminated by the light.

The cuboid 13 can, as is indicated in the FIG. 1, be either suspended in its position on the corner points of the warning triangle by means of flexible cords 17a–17c, but they may also be secured or suspended directly on the plastic sheet in an appropriately strengthened embodiment.

The power supply of the lighting means 19 of the warning triangle may be ensured either by means of batteries that are disposed inside the reflector legs 11a–11c or inside the flat cuboid 13, preferably at the rear of the warning triangle in suitable mounting means. As can be inferred particularly from the FIG. 2, it is also possible, alternatively hereto, to ensure the power supply via a cable 16 which is wound onto the cable drum 14 which can be inserted into the stand 10.

The cable is provided with an appropriate length marking every 50 m and, at its free cable end, with a plug 18 that fits into the cigarette lighter or the like. The appropriate power supply can be routed either to an incadescent or glow lamp 20 direct or via a switch. Naturally, the cable drum 14 is fitted with a crank or a motor drive 14a for rapidly rewinding the connecting cable.

The embodiment variant of the warning triangle 200 depicted in the FIG. 3 consists of a solid body triangle, in which, in the broadened lower base leg 11a, the cable drum 14 with the wound-on cable or distance-indicating cord and/or the batteries for the power supply and possible flashing circuits are accommodated. The advantage of this embodiment resides in that uniquely the preferably still foldably constructed legs of the stand 10 have yet to be actuated, but, apart from that, the warning triangle can be borne away from the vehicle and set up so as to be immediately operable. The cable and circuit connections are always protected against external influences.

The reflector legs 11a, 11b, 11c are in this case appropriately interspersed with heating filaments 21 so that, when the warning triangle 200 is put into operation, it is at all times ensured that the reflector legs 11a, 11b, 11c remain free even in snow since impinging snow flakes are thawed immediately. It is also possible to provide the white surface with heating filaments 21.

For preference, the warning triangle 200 constructed as a hollow solid body is equipped with an additional warning light 22. Said light-emitting additional warning light 22 results in an all-round securing of a danger spot. For this purpose, the warning light 22 known per se with a red, blue and/or yellow flashing light is inserted onto the warning triangle and connected with the power supply of the warning triangle 200 via a connector 25 consisting of a plug 23 and a socket 24. The light emergence areas of the warning light 22 are provided with heating filaments 26 which are embedded in the glass of the light emergence window 27.

The casing body 29 of the warning triangle 200 is provided with a plug 30 that is intended to be connected with a socket 31 and accommodated in the rear part of the car/trunk compartment in a mounting means. With this power supply furnished by the car battery which is connectable via the connector 32, the battery disposed in the warning triangle is recharged as well (battery charger). By this means it is ensures that the batteries in the warning triangle are at all times fully charged and thus always ready for use.

Provision may also be made for reflecting mirrors 33 (FIG. 2) in any configuration whatever to be disposed inside the flat cuboid 13 for advantageously illuminating the entire warning triangle. Likewise, the particularly advantageous arrangement of light conductors (not shown) in the form of glass fibre conductors for the well-directed illumination of specific areas and/or for the conduction of light, by way of example, in the cuboid 13, is possible. In the simpler embodiment, the warning triangle is operated in a permanently lighted mode. However, if a flashing operation is desired, then the use of one or several automatically flashing incandescent lamps or the multivibrator flashing circuit depicted in the FIG. 4 are an obvious choice.

In principle, a multivibrator is a two-step switching amplifier which, subsequent to the oscillation build-up, automatically flips from one state into the other. That is why it is possible to pick up at its output the "on" or "off" signal or a pulse train. The transistors 34,35 of the multivibrator voltage know only the two states of the full through switching or of total blocking. The process takes its course as follows: If the transistor 34 is switched on, its emitter-collector path constitutes a resistance of a few ohms. That is why the voltage at the collector is abruptly pulled down to almost zero potential, i.e. to the saturation voltage. This voltage jump makes itself felt via the condenser 36 to the base of the second transistor 35, in which case said condenser 36 and the emitter base path of the transistor 35 a high pass filter. The switching on of the first transistor 34 brings about that, on the base of the transistor 35, the voltage jump to a negative value and the transistor 35 is blocked thereby. However, the condenser 36, via the resistor 37, is now charged with an appropriate time constant to a positive potential, up to a value at which a base current is able to flow into the transistor 35, whereupon the latter switches from the blocking state to the breakdown state. A corresponding switching process now commences in respect of the transistor 34, i.e. the increase of current at the resistor of the glowing lamp 30 of the warning triangle light fitting depresses the voltage at the collector down to almost zero point, in which case this voltage jump acts via the condenser 30 upon the base of the transistor 34. The latter consequently blocks abruptly with the result that the condenser 36 is gradually charged via the resistor 38.

The circuit is to be laid out expediently in such a way that no additional transformers are required and that it is possible to establish an immediate connection with the 12 V electric circuit of the motor vehicle.

In this case allowance will have to be made for possible voltage losses over the cable length of 200 m to 500 m.

The multivibrator flashing circuit depicted in the FIG. 4 can be installed without any difficulty in the flat cuboid 13 (see FIGS. 1 and 2) or in the solid body 29 as per FIG. 3.

However, instead of employing a separate circuit, it is just as possible to make use of the timing generator provided in any case in the motor vehicle as timing element of the anti-collision light for lighting the warning triangle. When constructing a warning triangle in the form of a solid body according to FIG. 3, it is possible, of course, to arbitrarily select the point at which the light fittings are to be mounted. It is preferable, however, that the light fittings be disposed where it allows the minimum amount of shadow thrown to become visible, thus either behind the vertical black bar, behind the white surface and/or behind the red edge legs.

In principle it is also possible in this case to install smaller neon tubes or to provide a series connection of individual glow lamps.

When several incandescent lamps are employed, the circuit configuration may also be such that the incandescent lamps arranged along the triangle legs are switched on briefly in timed sequence. In that case, a revolving light signal is produced.

In order to improve the warning effect to be produced by means of the warning triangle still further, a distance-indicating signboard 40 or the like may be disposed within the area of the reflector leg 11a or of the stand 10 which may e.g. be pivotably mounted about the longitudinal axis of the reflector leg, which indicates the distance between the warning triangle and an obstacle, as e.g. "100 m" (FIG. 1) and may further be provided with heating filaments 40a.

The scope of application of the warning triangle described in the foregoing is, of course, not restricted to motor vehicle warning triangles since particularly the embodiment depicted in the FIG. 3 is suitable as warning sign for safeguarding short-term building sites. In comparison with stationary signs, these warning signs possess the advantage that, for brief periods of time, e.g. to render possible the passage of a building site vehicle, they can be removed without much effort and then to be returned once more into their original position. For this purpose, provision may be made for an insertion mounting means 41 on the casing body 29.

Furthermore, provision is made that, on the warning triangle, within the area of a reflector leg 11a–11c (not shown) of the stand 10 (not shown), or within the entire solid body 29, a warning hooter or foghorn 43 is disposed behind a sound emergence aperture 42. Alternatively hereto or by way of supplementation, a warning hooter or foghorn, 143 can also be rigidly mounted on the warning triangle or be suspendable on the latter. In this case, the foghorn 143 is, via a connector 46 comprising a plug 44 and a socket 45, connected to the power supply of the warning triangle 200 direct or with the aid of a cable. The warning hooter or foghorn 143 is in this case constructed so as to emit intermittent or continuous warning sounds. It is seen that the warning hooter or foghorn 143 may be used with the warning triangle 100.

In order to be able to transport the warning triangle more easily, wheels 47 or skids shown generally as 47a in FIG. 3 and being formed at the respective ends of the stand legs 10a, 10b and a foldable or telescopable pole (not shown) are fitted to the stands.

In order to provide a safety system with the warning triangle, an electric distress call transmitter 48 and a receiver 49 are provided which, actuated via a distress call button 50, triggers a warning light or sets off acoustic warning notes in another vehicle which is provided with an appropriate transmitter-receiver unit. Appropriate equipment may be fitted in the vehicle itself and provision can be made for a signal to be located to be emitted which actuates appropriate distress call means, by way of example, at relief organizations, police stations, fire department headquarters or the like and thus leads to a search being initiated for the warning triangle or the vehicle.

In order to effect an optimal height-wise adjustment of the warning triangle, especially when snow is falling, provision may be made for the stand legs 10a,10b to be constructed in a telescopable fashion, as is indicated in the FIG. 2 wherein the legs 10a and 10b respectively slide toward and away from the center bar 10c to adjust the triangle to the desired height. In this connection, the stand legs 10a,10b may, independently of their telescopable construction, be provided with light-reflecting fittings or glow lamps 51, as has been depicted in FIG. 3.

As an optimal way of ensuring that the warning triangle cannot be covered by snow, provision is made that the individual warning triangle components, such as the lighted warning triangle surface 52, the informatory distance-indicating signboard 40, the external surface of the light emergence areas of the warning light 22 or the reflector legs of the warning triangle are provided with one or several windshield wipers shown as 102,104 in FIG. 1 and 106 in FIG. 3, so that it will also be possible to keep the surfaces clean. The necessary electric drive can in this case be installed in the warning triangle proper.

We claim:

1. A warning triangle for motor vehicles having the shape and color corresponding to the "Danger Spot" warning sign wherein the warning triangle is luminous and the lighting is supplied with power by means of a cable that is directly or indirectly connectable with the vehicle battery or by means of a power source incorporated into the warning triangle, said warning triangle comprising:
   a stand including outwardly folding flat iron struts for supporting the warning triangle;
   three reflector legs arranged in the form of a triangle;
   a white background surface located interjacent said three reflector legs;
   a vertical black bar constructed in the form of a cuboid;
   means for suspending said vertical black bar by said reflector legs on said white background surface, and
   lighting means, said lighting means being located in said cuboid to illuminate said warning triangle.

2. Warning triangle according to claim 1, characterized in that the cuboid (13) includes a front and rear surface oppositely disposed one another and lateral surfaces, said front surface being opaque and said lateral surface (13b) being translucent to permit light to emerge through said lateral surfaces.

3. Warning triangle according to claim 1, characterized in that said means for suspending said cuboid (13) include a plurality of flexible cords (17a–17c) each of which have one end attached via eyelet connections on the respective corner points of the reflector legs (11a–11c) and their other respective ends coupled to said cuboid.

4. Warning triangle according to claim 1, characterized in that said means for suspending said cuboid (13) includes means for securing said cuboid to a plastic sheet fabric (12), said plastic sheet fabric comprising said white (background) surface said plastic being of sufficient strength to support said cuboid.

5. Warning triangle according to claim 2, characterized in that said lighting means (10) comprises a light generator in the form of a glow lamp (20).

6. Warning triangle according to claim 5, characterized in that the power source further comprises a battery disposed inside at least one of said reflector leg(s) (11a–11c) and is connectable to said lighting means (19) via an appropriate interconnection cable.

7. Warning triangle according to claim 6, characterized in that said reflector legs (11a–11c) are constructed so as to be luminous.

8. Warning triangle according to claim 7, further including heating filaments (21a) and characterized in that the light emergence areas of said cuboid (13) and said reflector legs (11a–11c) are, at least in part, provided with said heating filaments (21a).

9. Warning triangle according to claim 8, characterized in that the warning triangle (200) is combined with a warning light (22) having a red, blue and/or yellow flashing light, wherein the warning light (22) is rigidly connected to the warning triangle (200) or is insertable onto the latter and is connectable to the power supply of the warning triangle 9200) by means of a connector (25) consisting of a plug (23) and a socket (24).

10. Warning triangle according to claim 9, characterized in that the light emergence areas of the warning light (22) are provided with heating filaments.

11. Warning triangle according to claim 10, characterized in that the warning triangle (100; 200) is, within the area of the reflector leg (11a) and the stand (10), provided with a pivotably mounted information or distance-indicating signboard (40).

12. Warning triangle according to claim 11, characterized in that the information or distance-indicating signboard (40) is, at least in part, provided with heating filaments.

13. Warning triangle according to claim 12, characterized in that the cable (16) or the distance-indicating cord is wound onto a drum (14) secured on or in the warning triangle.

14. Warning triangle according to claim 13, characterized in that the drum (14) for the cable (16) or the distance-indicating cord is detachably secured on the stand by means of a connector (110) consisting of a plug (111) and a socket (112).

15. Warning triangle according to claim 14, characterized in that the cable drum (14) or the distance-indicating cord drum is located in the lower base reflector leg (11a).

16. Warning triangle according to claim 15, characterized in that the cable drum (14) or the distance-indicating cord drum disposed within the lower base reflector leg (11a) can be driven by a crank or a drive motor and can be actuated in a manually or automatically controlled manner.

17. Warning triangle according to claim 16, characterized in that the white background surface is constructed in the form of a plastic sheet fabric (12) having a cutout for fixedly supporting said cuboid (13).

18. Warning triangle according to claim 17, characterized in that the information or distance-indicating signboard (40) is laterally insertable into the warning triangle and is illuminated by means of the power supply of the warning triangle.

19. Warning triangle according to claim 12, characterized in that the distance between the warning triangle and the vehicle indicated on the distance-indicating signboard (40) and the cause of the emergency stop indicated on the information signboard (40) is manually or automatically changeable.

20. Warning triangle according to claim 1 characterized in that the warning triangle (200) comprises, a compact, solid body having hollow portions within the area of a reflector leg of the stand and a foghorn/warning hooter (43) disposed behind a sound-emergence aperture (42) in said body.

21. Warning triangle according to claim 20, characterized in that a second warning hooter/foghorn (143) is mounted fixedly on the warning triangle (200) and is constructed so as to be suspendable from and so as to be connectable to the power supply of the warning triangle (200) by means of a connector (46) consisting of a plug (44) and a socket (45).

22. Warning triangle according to claim 21, characterized in that the warning hooter or the foghorn (43; 143) in/on the warning triangle, emits intermittent or continuous warning sounds.

23. Warning triangle according to claim 22, characterized in that the warning triangle (200) is carried on wheels (47) or skids (47a) coupled to said stand.

24. Warning triangle according to claim 23, characterized in that, in or on the warning triangle (200), or inside the vehicle, an electronic distress call emitter (48)/receiver (49) having a specific range is disposed and, triggered by an emergency button (50) or switch, sets off another optical red warning light located within the area of the warning triangle as well as triggering acoustic waring sounds.

25. Warning triangle according to claim 24, characterized in that the legs of the stand (10a-10d) of the warning triangle (100) are constructed so as to be telescopable.

26. Warning triangle according to claim 25, characterized in that the legs of the stand (10a-10c) of the warning (200) are provided with light reflecting fittings/glow lamps (51).

27. Warning triangle according to claim 26, characterized in that the illuminated warning triangle surface (52) and/or the information or distance-indicating signboard (40) is provided with a windshield wiper.

28. Warning triangle according to claim 27, characterized in that, in the warning triangle, or on the warning triangle, a distress signal rocket is disposed which is visible from afar and which can be rendered luminescent.

29. Warning triangle according to claim 13, characterized in that the warning triangle is provided with a drive means that can be triggered by a remote control means to wind said cable onto said drum.

* * * * *